UNITED STATES PATENT OFFICE.

HUGH BURGESS, OF ROYER'S FORD, PENNSYLVANIA.

IMPROVEMENT IN ANTI-INCRUSTATING COMPOUNDS.

Specification forming part of Letters Patent No. 168,222, dated September 28, 1875; application filed September 1, 1875.

To all whom it may concern:

Be it known that I, HUGH BURGESS, of Royer's Ford, Montgomery county, Pennsylvania, have invented an Improved Anti-Incrustating Compound, of which the following is a specification:

The object of my invention is to remove incrustation from, and prevent its accumulation in, steam-boilers, by the aid of pinate or sylvate of soda, or a mixture of the two.

In order to prepare the compound I take about six hundred and ten pounds of common rosin, and about one hundred pounds of dry hydrate of soda. The latter I dissolve in about ninety gallons of hot water, and I add the powdered rosin slowly while the soda or other equivalent alkaline solution is boiling, and after all the rosin has been added the boiling should be continued for about five hours, in order to insure the entire dissolving of the rosin, slow boiling being necessary to prevent foaming. When the mixture is allowed to cool a separation takes place, a pasty mass settling at the bottom of the vessel, while a dark solution floats on this mass. The mass which settles at the bottom of the vessel is a mixture of pinate and sylvate of soda, while the dark floating liquid consists of other organic acids contained in the rosin.

Either the pasty mass alone may be employed as an anti-incrustating composition by simply introducing it into the steam-boiler, or the pasty mass and superincumbent fluids may be recombined by the action of heat, and introduced together into the boiler. The quantity of the compound to be introduced into a boiler will depend upon the character of the water used therein, and in some cases the water may be such as to demand the addition to the composition of caustic or carbonated alkali.

In producing the pinate and sylvate of soda, hydrate of potash may be used in place of the hydrate of soda, or even carbonates of soda or potash, providing they are sufficient in strength and quantity to bring about the desired result.

I claim as my invention—

An anti-incrustating composition consisting of pinate or sylvate of soda, as set forth.

In testimony whereof I have signed my name to this specification in the presence of two subscribing witnesses.

HUGH BURGESS.

Witnesses:
S. B. LATSHAW,
ALF. MILLER.